Feb. 13, 1934.   M. R. PHINNEY   1,946,946
SEAL FOR AUTOMOBILE LICENSE PLATES
Filed July 18, 1933
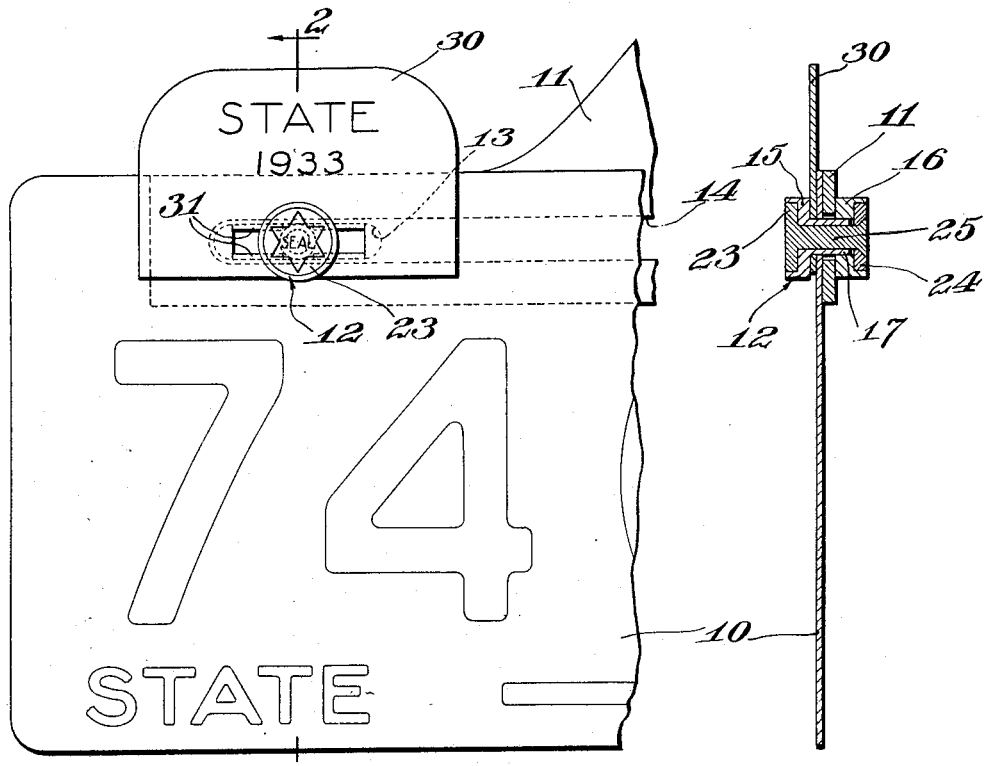
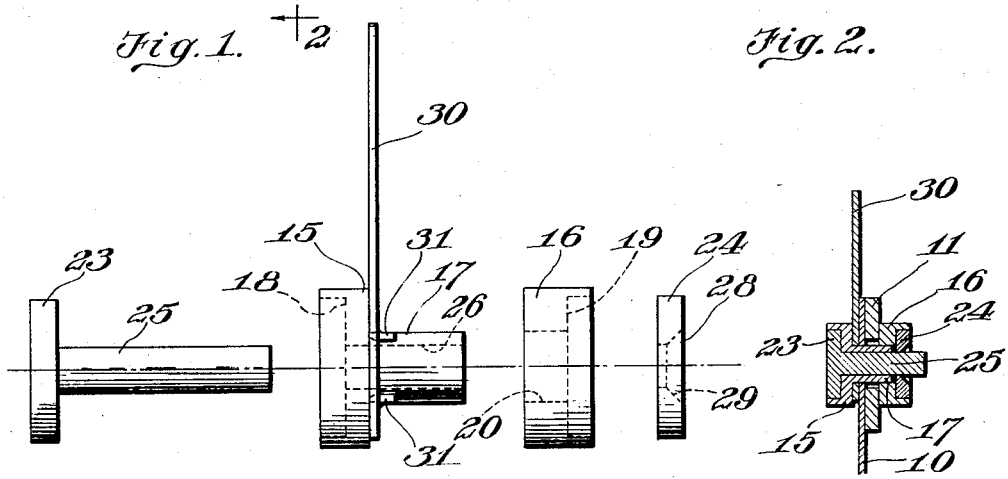
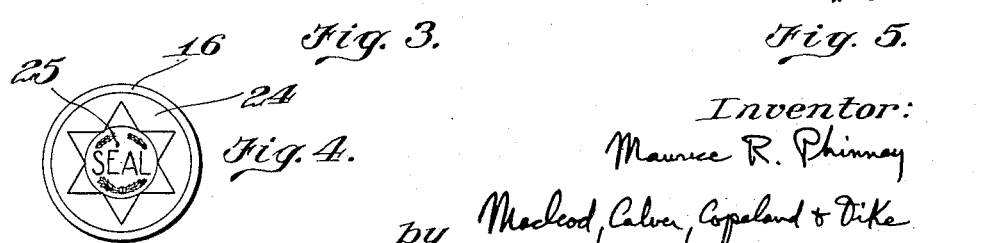
Inventor:
Maurice R. Phinney
by Macleod, Calver, Copeland & Dike
Attys.

Patented Feb. 13, 1934

1,946,946

UNITED STATES PATENT OFFICE 1,946,946

SEAL FOR AUTOMOBILE LICENSE PLATES

Maurice R. Phinney, Hyannis, Mass., assignor to Numpad Incorporated, Hyannis, Mass., a corporation of Massachusetts Application July 18, 1933. Serial No. 680,935

4 Claims. (Cl. 40—125)

Every owner of a motor vehicle is required to register the vehicle in a prescribed manner and is supplied with official number plates which must be attached to the vehicle and identify that particular vehicle. In all instances, a prescribed registration fee is required. Before the registration can be obtained in many states the owner of the vehicle must obtain insurance to compensate for possible injury to persons that may be caused by the vehicle while being driven on the highway. Because of the expense involved by complying with these requirements many unscrupulous people often attempt to transfer the registration number plates from a registered vehicle to one which has not been registered.

It is the object of the present invention to provide a device for attaching registration number plates to vehicles which is adapted to receive an impression of an official seal and which cannot be removed except by destroying the device or breaking the seal.

The invention will be more clearly understood from the following description in conjunction with the accompanying drawing: in which, Fig. 1 is a fragmentary view of a number plate attached to a vehicle by a device embodying the invention;

Fig. 2 is a sectional view taken upon the line 2—2 of Fig. 1;

Fig. 3 is a detail view of the attaching device with its various parts in position to be assembled together;

Fig. 4 is a detail view of the attaching device as viewed from the right of Fig. 2; and Fig. 5 is a view similar to Fig. 2 showing the parts assembled but not clamped together.

Before explaining in detail the present invention it is to be understood that the invention is not limited in its application to the details of construction and arrangement of parts illustrated in the accompanying drawing, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

In the accompanying drawing, a registration number plate 10 is shown attached to a bracket 11 forming part of the vehicle (not shown) by an attaching device 12 embodying the invention and which is inserted through the slots 13 and 14 in the number plate 10 and bracket 11, respectively. The device 12 comprises a pair of cooperating washer-like members 15 and 16 which may be of any suitable material, such as steel. The member 15 is provided with a sleeve-like extension or body portion 17 extending from the inner face thereof. The outer faces of the members 15 and 16 are provided with recesses 18 and 19, respectively. Member 16 is provided with a passage 20 to receive the body portion 17 of the member 15. The members 15 and 16 are held upon opposite sides of the number plate 10 by the cooperating disks 23 and 24 which are adapted to fit in the recesses 18 and 19 respectively and, preferably, are made from a soft material capable of receiving the impression of an official seal as illustrated. The disks 23 and 24 may be soft metal, such as lead or brass. The disk 23 is provided with a rod-like extension or body portion 25 extending therefrom and adapted to be inserted through a passage 26 in the member 15. The disk 24 is provided with a passage 28 having an outwardly tapered portion 29 adjacent the outer face of the disk. A tab 30 of sheet metal may be positioned adjacent the inner face of one of the members 15 and 16 and is provided with inturned ears 31 adapted to engage one edge of the slot 13. If desired, the tab 30 may be welded to the inner face of one of the members 15 and 16. The tab may bear the name of the state in which the vehicle is registered and the date.

In attaching the number plate 10 to the outer face of the bracket 11 the slot 13 in the former is placed opposite the slot 14 in the latter. The body portion 17 of the member 15 is then inserted through the slots 13 and 14 from the outer face of the number plate. The member 16 is then fitted upon the body portion 17 so as to engage snugly the inner surface of the bracket 11. The disk 24 is then placed in the recess 19 in the member 16 and the rod-like extension 25 of the disk 23 is inserted through the passage 26 of the member 15 so that the disk 23 will be positioned in the recess 18 and the end of the member 25 will extend slightly beyond the outer face of the disk 24, as shown in Fig. 5. The end of the member 25 is then spread out so as to fill the tapered passage 29 in the disk 24, as shown in Fig. 2, and thus securely unite the parts so as to clamp the members 15 and 16 upon opposite sides of the number plate 10 and bracket 11. An impression of an official seal is made upon the outer faces of the disks 23 and 24. It will be noted that inasmuch as the body portion 17 of the member 15 serves as a bearing for the member 16, these members receive substantially all the strain to which the device may be subjected. Consequently, the disks 23 and 24 and their connecting member 25 may be of relatively soft material having a low shearing and tensile strength and one upon which an impression of an official seal may be easily made.

I claim:

1. A device for preventing unauthorized attachment or removal of registration number plates for vehicles comprising hollow members between which a number plate is clamped, one of said members having a body portion insertable through the openings in the number plate and a bracket carried by the vehicle, said body portion being adapted to receive and serve as a bearing for the other member, each of said members having a recess in its outer face, and means for tying said members together including disk-like members adapted to fit in the recesses of said members and receive the impression of a seal and having a connection through said members.

2. A device for preventing unauthorized attachment or removal of registration number plates for vehicles comprising hollow members between which a number plate is clamped, one of said members having a body portion insertable through the openings in the number plate and a bracket carried by the vehicle, said body portion being adapted to receive and serve as a bearing for the other member, each of said members having a recess in its outer face, and soft metal disks adapted to fit in the recesses in said members and receive the impression of a seal, one of said disks having a passage tapered outwardly at its outer end, the other of said disks having a body portion adapted to extend through said members and said passage and be spread into the tapered portion of said passage.

3. A device for preventing unauthorized attachment or removal of registration number plates for vehicles comprising hollow members between which a number plate is clamped, one of said members having a body portion insertable through the openings in the number plate and a bracket carried by the vehicle, said body portion being adapted to receive and serve as a bearing for the other member, each of said members having a recess in its outer face, soft metal disks adapted to fit in the recesses in said members and receive the impression of a seal, one of said disks having a passage tapered outwardly at its outer end, the other of said disks having a body portion adapted to extend through said members and said passage and be spread into the tapered portion of said passage, and a tab positioned adjacent the inner face of one of said members.

4. A device for preventing unauthorized attachment or removal of registration number plates for vehicles comprising hollow members between which a number plate is clamped, one of said members having a body portion insertable through the openings in the number plate and a bracket carried by the vehicle, said body portion being adapted to receive and serve as a bearing for the other member, each of said members having a recess in its outer face, soft metal disks adapted to fit in the recesses in said members and receive the impression of a seal, one of said disks having a passage tapered outwardly at its outer end, the other of said disks having a body portion adapted to extend through said members and said passage and be spread into the tapered portion of said passage, and a tab secured to the inner face of one of said members and having an inturned ear adapted to engage one edge of the opening in the number plate.

MAURICE R. PHINNEY.